(12) United States Patent
Kumar et al.

(10) Patent No.: US 12,250,208 B2
(45) Date of Patent: Mar. 11, 2025

(54) METHOD OF TERMINATING NETWORK DEVICE SESSION

(71) Applicant: RAKUTEN MOBILE, INC., Tokyo (JP)

(72) Inventors: Hitesh Kumar, Indore (IN); Shiv Chandra Pathak, Indore (IN); Chandresh Bhalse, Indore (IN)

(73) Assignee: RAKUTEN MOBILE, INC., Tokyo (JP)

(*) Notice: Subject to any disclaimer, the term of this patent is extended or adjusted under 35 U.S.C. 154(b) by 0 days.

(21) Appl. No.: 17/801,167

(22) PCT Filed: Jun. 22, 2022

(86) PCT No.: PCT/US2022/034497
§ 371 (c)(1),
(2) Date: Aug. 19, 2022

(87) PCT Pub. No.: WO2023/249623
PCT Pub. Date: Dec. 28, 2023

(65) Prior Publication Data
US 2024/0187398 A1  Jun. 6, 2024

(51) Int. Cl.
*H04L 9/40* (2022.01)
*H04L 65/1069* (2022.01)

(52) U.S. Cl.
CPC ......... *H04L 63/083* (2013.01); *H04L 63/102* (2013.01); *H04L 65/1069* (2013.01)

(58) Field of Classification Search
CPC .................. H04L 65/1066; H04L 65/1069
See application file for complete search history.

(56) References Cited

U.S. PATENT DOCUMENTS

2022/0046097 A1* 2/2022 Noldus ............... H04L 65/1069

FOREIGN PATENT DOCUMENTS

EP         3891947 B1 *  8/2022   ......... H04L 65/1006

OTHER PUBLICATIONS

International Search Report dated Nov. 18, 2022 issued by the International Searching Authority in Application No. PCT/US22/34497.
Written Opinion dated Nov. 18, 2022 issued by the International Searching Authority in Application No. PCT/US22/34497.

* cited by examiner

*Primary Examiner* — Kostas J Katsikis
(74) *Attorney, Agent, or Firm* — Sughrue Mion, PLLC

(57) ABSTRACT

A method for session termination includes receiving, by a script server from an operations support system (OSS), a request to terminate a session of at least one target device, the request being generated based on a selection of the at least one target device by a server device, executing, by the script server, a termination script to terminate the session of the at least one target device based on the request to terminate the session, receiving, by the script server, a response indicating a result of the termination script execution, and sending, by the script server to the OSS, the result of the termination script execution.

20 Claims, 13 Drawing Sheets

| Session Termination Request | | | | |
|---|---|---|---|---|
| Request Status | NE ID (UHN) | IPv6 Address | Responsible Module | Failure Reason |
| ☐ COMPLETED | ******** | ******** | Security Mgmt | - |
| ☐ INPROGRESS | ******** | ******** | Security Mgmt | - |
| ☐ FAILED | ******** | ******** | Security Mgmt | TARGET DEVICE NOT PRESENT |

FIG. 4A

| Session Termination Request | | | | |
|---|---|---|---|---|
| Request Status | NE ID (UHN) | IPv6 Address | Responsible Module | Failure Reason |
| ☐ COMPLETED | ****** | ****** | Security Mgmt | - |
| ☐ INPROGRESS | ****** | ****** | | - |
| ☐ FAILED | | | | TARGET DEVICE NOT PRESENT |

Session Termination Request ✕

Select\* [NE ID (UHN) ▾]  [************ ▾] — 434

432 — NE ID (UHN)
Select Account

[Account Type\* ▾] [User Type\* ▾] [Username\* ▾]

436            438         CANCEL  SUBMIT
                                    440

FIG. 4F

| Session Termination Request | | | | | |
|---|---|---|---|---|---|
| | | | | ⊕ ↻ | ≡ |
| ☐ Request Status | NE ID (UHN) | IPv6 Address | Responsible Module | | Failure Reason |
| ☐ ║ COMPLETED | ****** | ****** | Security Mgmt | | - |
| ☐ ║ INPROGRESS | ****** | ****** | | | - |
| ☐ ║ FAILED | | | | | TARGET DEVICE NOT PRESENT |

Session Termination Request    ✕

Select *    NE ID(UHN)

[NE ID(UHN) ▽] [************ ⊕]

Select Account

Account Type*    User Type*    Username*

[Golden ▽] [Os ▽] [************ ▽]

↕ CANCEL    SUBMIT 432    434    436    438    440

FIG. 4G

| Session Termination Request | | | | Manual | 422 | |
|---|---|---|---|---|---|---|
| ☐ Request Status | NE ID (UHN) | IPv6 Address | Responsi | Upload Files | | Reason |
| ☐ COMPLETED | ******* | ******* | Security Mgmt | - | | |
| ☐ INPROGRESS | ******* | ******* | Security Mgmt | - | | |
| ☐ [FAILED] | ******* | ******* | Security Mgmt | | | TARGET DEVICE NOT PRESENT |

METHOD OF TERMINATING NETWORK DEVICE SESSION

CROSS REFERENCE TO RELATED APPLICATIONS

This application is a National Stage of International Application No. PCT/US2022/034497 filed Jun. 22, 2022.

BACKGROUND

1. Field

Apparatuses and methods consistent with example embodiments of the present disclosure relate to terminating network device sessions.

2. Description of Related Art

In related art, when it is determined that a session of a user to a server device should be terminated, the termination process is typically performed manually or no termination occurs at all, which increases the required human intervention and increases the number of errors and security risks.

SUMMARY

According to embodiments, systems and methods are provided for executing a termination script to terminate a session of at least one target device from a server device.

According to embodiments, a method for session termination includes receiving, by a script server from an operations support system (OSS), a request to terminate a session of at least one target device, the request being generated based on a selection of the at least one target device by a server device, executing, by the script server, a termination script to terminate the session of the at least one target device based on the request to terminate the session, receiving, by the script server, a response indicating a result of the termination script execution, and sending, by the script server to the OSS, the result of the termination script execution.

The selection of the at least one target device by the server device may be performed in response to a credential change of the at least one target device.

The credential change of the at least one target device may occur during the session. The credential change may include a password change initiated by the server device.

The request to terminate the session of the at least one target device may include at least one credential of the server device.

The executing, by the script server, the termination script may include accessing the server device from a root user and terminating the session of the at least one target device.

The response indicating the result of the termination script execution may include a failure indication when the session of the at least one target device does not exist on the server device.

According to embodiments, a system for session termination includes a server device, an OSS, and a script server. The script server is configured to receive, from the OSS, a request to terminate a session of at least one target device, the request being generated based on a selection of the at least one target device by the server device, execute a termination script to terminate the session of the at least one target device based on the request to terminate the session, receive a response indicating a result of the termination script execution, and send, to the OSS, the result of the termination script execution.

The selection of the at least one target device by the server device may be performed in response to a credential change of the at least one target device.

The credential change of the at least one target device may occur during the session.

The credential change may include a password change initiated by the server device.

The request to terminate the session of the at least one target device may include at least one credential of the server device.

The script server may be configured to execute the termination script by accessing the server device from a root user, and terminating the session of the at least one target device.

The response indicating the result of the termination script execution may include a failure indication when the session of the at least one target device does not exist on the server device.

According to embodiments, a non-transitory computer-readable storage medium stores instructions that, when executed by at least one processor, cause the at least one processor to receive, by a script server from an OSS, a request to terminate a session of at least one target device, the request being generated based on a selection of the at least one target device by a server device, execute, by the script server, a termination script to terminate the session of the at least one target device based on the request to terminate the session, receive, by the script server, a response indicating a result of the termination script execution, and send, by the script server to the OSS, the result of the termination script execution.

The selection of the at least one target device by the server device may be performed in response to a credential change of the at least one target device.

The credential change of the at least one target device may occur during the session.

The credential change may include a password change initiated by the server device.

The request to terminate the session of the at least one target device may include at least one credential of the server device.

The instructions, when executed, may cause the at least one processor to execute, by the script server, the termination script by accessing the server device from a root user, and terminating the session of the at least one target device.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIGS. 4A, 4B, 4C, 4D, 4E, 4F, 4G, 4H and 4I are diagrams of a user interface (UI) for terminating a session, according to an embodiment.

DETAILED DESCRIPTION

Figure 1:
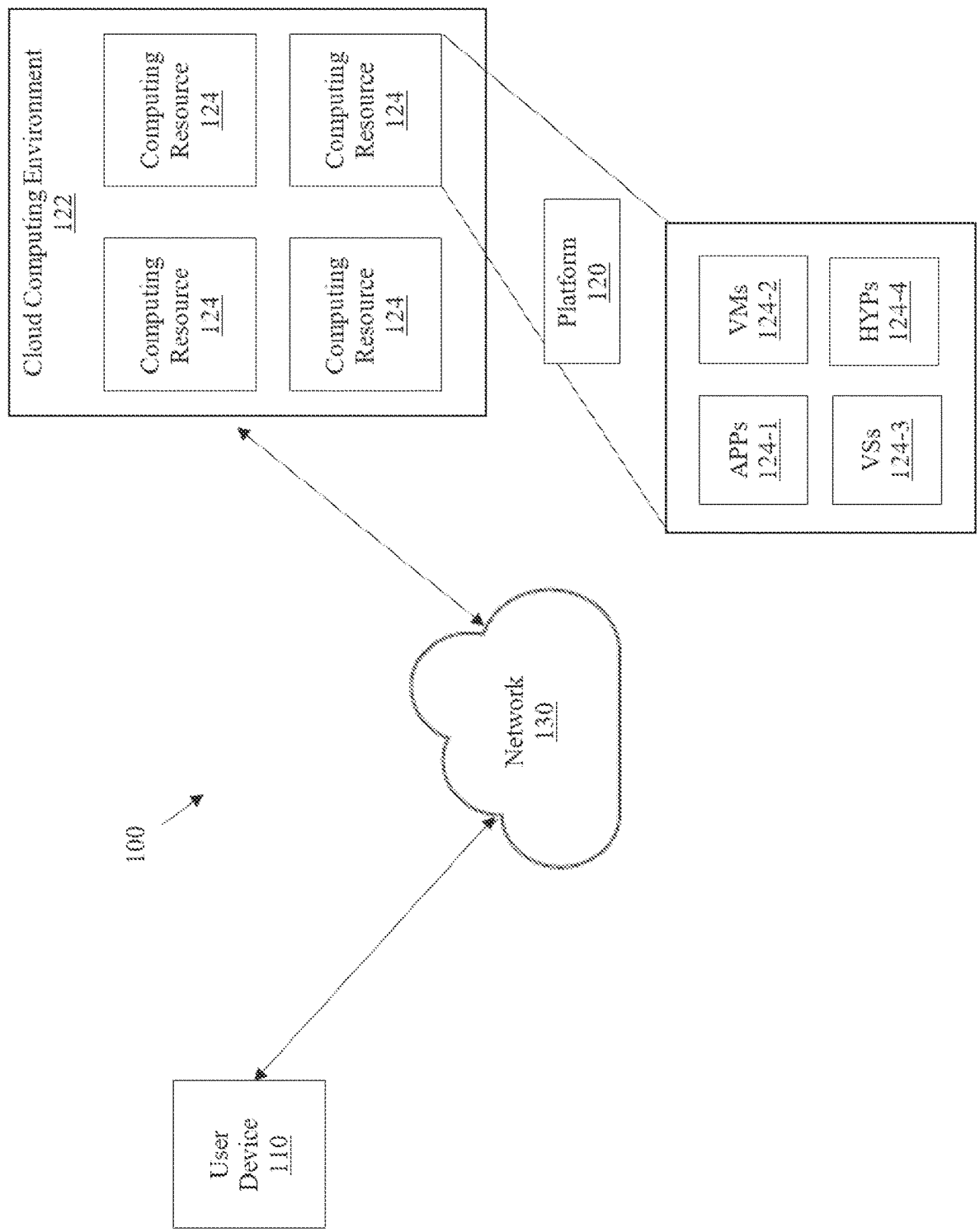
FIG. 1 is a diagram of an example environment in which systems and/or methods, described herein, may be implemented.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system in which in which a script server may be configured to receive termination requests to terminate sessions of target devices (e.g., user devices) accessing, for example, large cloud networks/servers. The requests to terminate the sessions may be manually generated by an operator of a server device and/or automatically generated in response to a certain event occurring (including, for example, credentials of the target devices changing during a session, a change in software deployment rate during a session, etc., to prevent unauthorized access to devices). The script server may be configured to execute a termination script to terminate the session of the target device. The script server may receive an indication as to a result of the execution of the termination script, and provide the indication to an operations support system (OSS). The systems and methods may provide an interface through which a termination request may be generated and a record of termination request may be provided through the interface. The record may include an indication as to the result of the generated termination request.

FIG. 1 is a diagram of an example environment 100 in which systems and/or methods, described herein, may be implemented. As shown in FIG. 1, environment 100 may include a user device 110, a platform 120, and a network 130. Devices of environment 100 may interconnect via wired connections, wireless connections, or a combination of wired and wireless connections. In embodiments, any of the functions and operations described with reference to FIG. 1 above may be performed by any combination of elements illustrated in FIG. 1.

User device 110 includes one or more devices capable of receiving, generating, storing, processing, and/or providing information associated with platform 120. For example, user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 110 may receive information from and/or transmit information to platform 120.

Platform 120 includes one or more devices capable of receiving, generating, storing, processing, and/or providing information. In some implementations, platform 120 may include a cloud server or a group of cloud servers. In some implementations, platform 120 may be designed to be modular such that certain software components may be swapped in or out depending on a particular need. As such, platform 120 may be easily and/or quickly reconfigured for different uses.

In some implementations, as shown, platform 120 may be hosted in cloud computing environment 122. Notably, while implementations described herein describe platform 120 as being hosted in cloud computing environment 122, in some implementations, platform 120 may not be cloud-based (i.e., may be implemented outside of a cloud computing environment) or may be partially cloud-based.

Cloud computing environment 122 includes an environment that hosts platform 120. Cloud computing environment 122 may provide computation, software, data access, storage, etc. services that do not require end-user (e.g., user device 110) knowledge of a physical location and configuration of system(s) and/or device(s) that hosts platform 120. As shown, cloud computing environment 122 may include a group of computing resources 124 (referred to collectively as "computing resources 124" and individually as "computing resource 124").

Computing resource 124 includes one or more personal computers, a cluster of computing devices, workstation computers, server devices, or other types of computation and/or communication devices. In some implementations, computing resource 124 may host platform 120. The cloud resources may include compute instances executing in computing resource 124, storage devices provided in computing resource 124, data transfer devices provided by computing resource 124, etc. In some implementations, computing resource 124 may communicate with other computing resources 124 via wired connections, wireless connections, or a combination of wired and wireless connections.

As further shown in FIG. 1, computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

Application 124-1 includes one or more software applications that may be provided to or accessed by user device 110. Application 124-1 may eliminate a need to install and execute the software applications on user device 110. For example, application 124-1 may include software associated with platform 120 and/or any other software capable of being provided via cloud computing environment 122. In some implementations, one application 124-1 may send/receive information to/from one or more other applications 124-1, via virtual machine 124-2.

Virtual machine 124-2 includes a software implementation of a machine (e.g., a computer) that executes programs like a physical machine. Virtual machine 124-2 may be either a system virtual machine or a process virtual machine, depending upon use and degree of correspondence to any real machine by virtual machine 124-2. A system virtual machine may provide a complete system platform that supports execution of a complete operating system ("OS"). A process virtual machine may execute a single program, and may support a single process. In some implementations, virtual machine 124-2 may execute on behalf of a user (e.g., user device 110), and may manage infrastructure of cloud computing environment 122, such as data management, synchronization, or long-duration data transfers.

Virtualized storage 124-3 includes one or more storage systems and/or one or more devices that use virtualization techniques within the storage systems or devices of computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 124-4 may provide hardware virtualization techniques that allow multiple operating systems (e.g., "guest operating systems") to execute concurrently on a host computer, such as computing resource 124. Hypervisor 124-4 may present a virtual operating platform to the guest operating systems, and may manage the execution of the guest operating systems. Multiple instances of a variety of operating systems may share virtualized hardware resources.

Network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
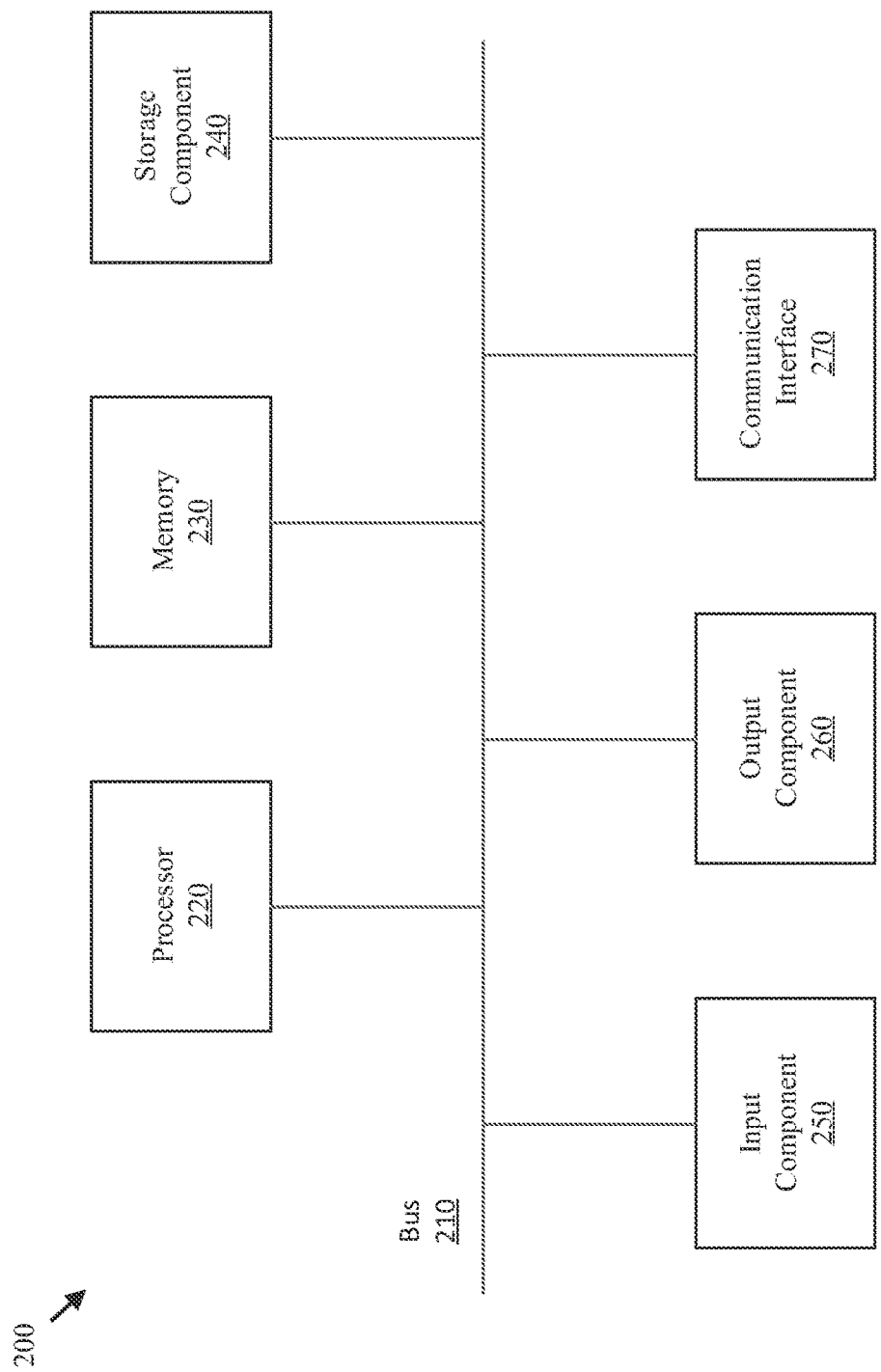
FIG. 2 is a diagram of example components of a device according to an embodiment.

FIG. 2 is a diagram of example components of a device 200. Device 200 may correspond to user device 110 and/or platform 120. As shown in FIG. 2, device 200 may include a bus 210, a processor 220, a memory 230, a storage component 240, an input component 250, an output component 260, and a communication interface 270.

Bus 210 includes a component that permits communication among the components of device 200. Processor 220 may be implemented in hardware, firmware, or a combination of hardware and software. Processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 220 includes one or more processors capable of being programmed to perform a function. Memory 230 includes a random access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 250 includes a component that permits device 200 to receive information, such as via user input (e.g., a touch screen display, a keyboard, a keypad, a mouse, a button, a switch, and/or a microphone). Additionally, or alternatively, input component 250 may include a sensor for sensing information (e.g., a global positioning system (GPS) component, an accelerometer, a gyroscope, and/or an actuator). Output component 260 includes a component that provides output information from device 200 (e.g., a display, a speaker, and/or one or more light-emitting diodes (LEDs)).

Communication interface 270 includes a transceiver-like component (e.g., a transceiver and/or a separate receiver and transmitter) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

Device 200 may perform one or more processes described herein. Device 200 may perform these processes in response to processor 220 executing software instructions stored by a non-transitory computer-readable medium, such as memory 230 and/or storage component 240. A computer-readable medium is defined herein as a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

In a large cloud or hybrid network including a large number of servers (e.g., millions to trillions of servers), it is difficult to perform operations manually, such as session terminations and session termination tracking. For example, an earlier user may login to the device with the access credentials, and after that, the user may need to run the command to terminate the session (i.e., manually selecting the user/device and manually killing the session of the user in the device). Furthermore, for manual operations, a user would require access credentials, such as passwords or other authentication mechanisms, to access the termination application, which increases the risk of a breach of security protocols.

Thus, provided herein are execution ready termination scripts deployed for various network types which are configured to terminate the session of logged-in users. The termination scripts may be triggered by users forcefully terminating the session or other events, such as credential changes or software deployment rate changes. The termination scripts may include automated workflows to operate as a single task. For example, if a password of a particular server device is changed, it may be mandatory to terminate all the sessions of all devices accessing the particular server device. Otherwise, users who are logged-in to the particular server with older passwords would be able to still access the server device, which creates a security breach (i.e., the termination script would allow for all devices with a session to the server to be terminated instead of requiring a manual termination of each session for each device).

A user of a user interface (UI) may generate a request for session termination by selecting the server device and a user name (or user names, or may import a list of user names as will be described later). The request may be submitted to a script server where a backend script runs (e.g., python). The script server may log in to the server device from a root user and terminate the session of the requested user(s). After execution of the termination script, the script server may notify the OSS of the success or failure of the session termination request.

Figure 3:
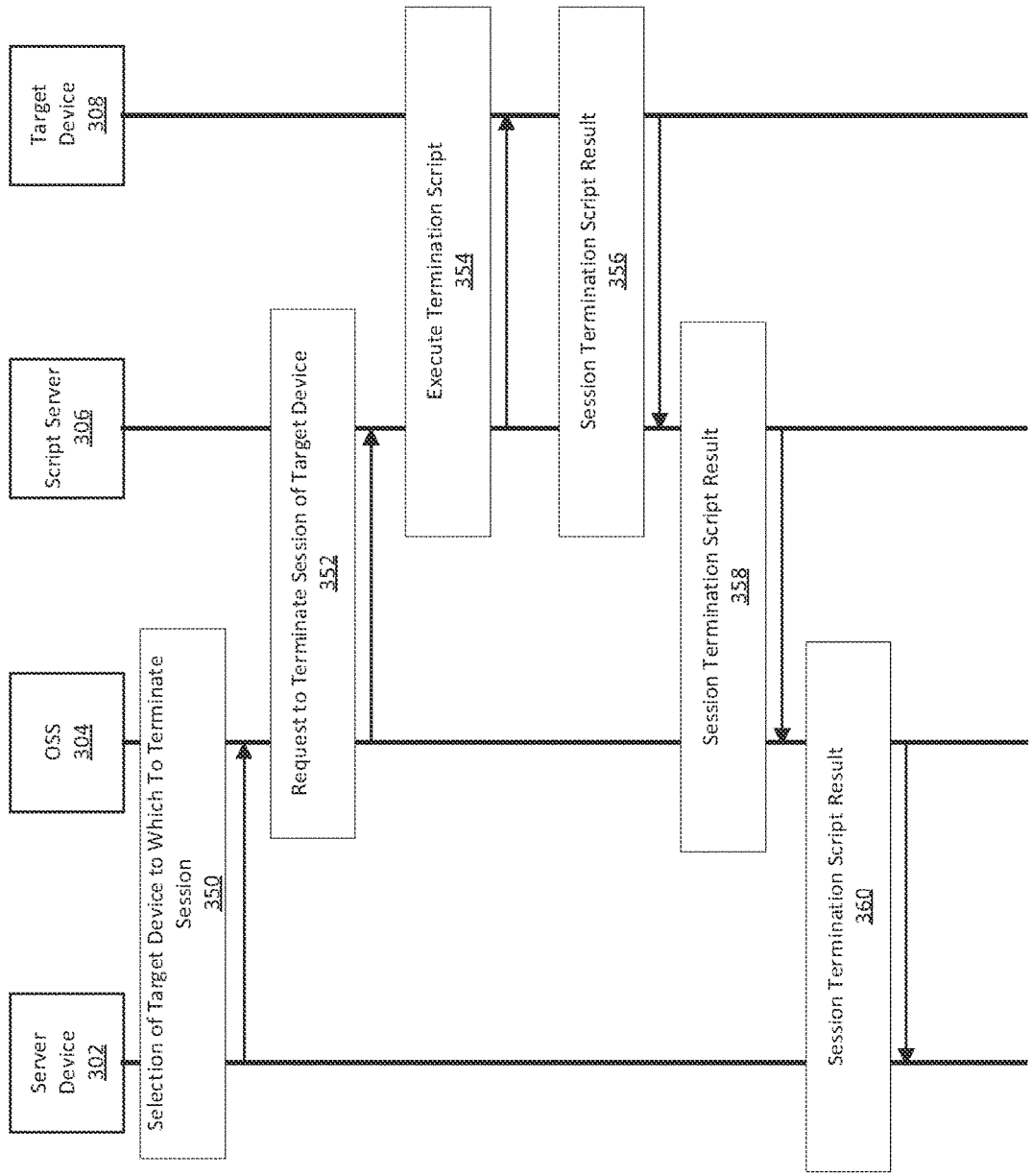
FIG. 3 is a diagram of an operation flow of a system for session terminations, according to an embodiment.

FIG. 3 is a diagram of an operation flow of a system for session terminations, according to an embodiment. The system may include a server device 302, an OSS 304, a script server 306 and at least one target device 308. The server device 302 may correspond to a server in a large cloud or hybrid network. The OSS 304 may correspond to an operation system through which a user may access a UI to generate a session termination request. The script server 306 may correspond to a backend server that executes a termination script (e.g., a python script) to terminate sessions. The at least one target device 308 may correspond to a target device(s) with a session with the server device 302.

In operation 350, the OSS 304 receives a selection from the server device 302 of at least one target device (e.g., the at least one target device 308) to which to terminate a session. The selection may be generated based on a credential change of the server device 302 during the session (e.g., a password change), a credential change of the at least one target device 308 (e.g., a password), a change in software deployment rate during the session, etc. In operation 352, the OSS 304 sends a request to terminate the session of the at least one target device 308 to the script server 306. The request to terminate the session may include a username associated with the at least one target device, secured shell (SSH) root internet protocol (IP) address/information and credentials of the server device 302, an address of the at least one target device 308, etc. In operation 354, the script server 306 executes a termination script to terminate the session of the at least one target device 308 based on the request received from the OSS 304. The script server 306 may execute the termination script by accessing the server device 302 from a root user configured for accessing the server device 302, and terminating the session of the at least one target device 308 using the root user access to the server device 302.

In operations 356, 358 and 360, a result of the session termination script execution is transmitted back to the script server 306, the OSS 304 and/or the server device 302. The script server 306 may receive the result of the termination script execution from the at least one target device 308 and or from the root user access to the server device 302. The result may indicate that the termination script execution was successful (i.e., the session of the at least one target device 308 is terminated). The result may indicate that the termination script execution failed (e.g., a failure indication). The termination script execution may fail for various reasons, such as the session of at least one target device 308 no longer being active, the selected at least one target device 308 being incorrectly identified as having the session that needs to be terminated, a communication failure, etc.

Figure 4B:
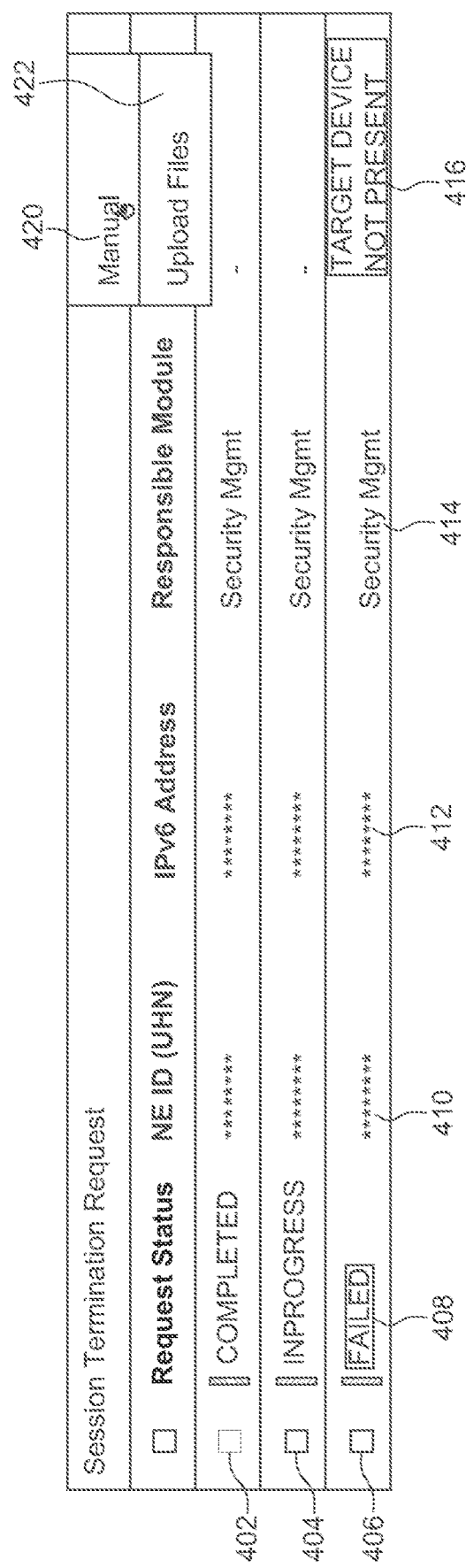
Figure 4C:
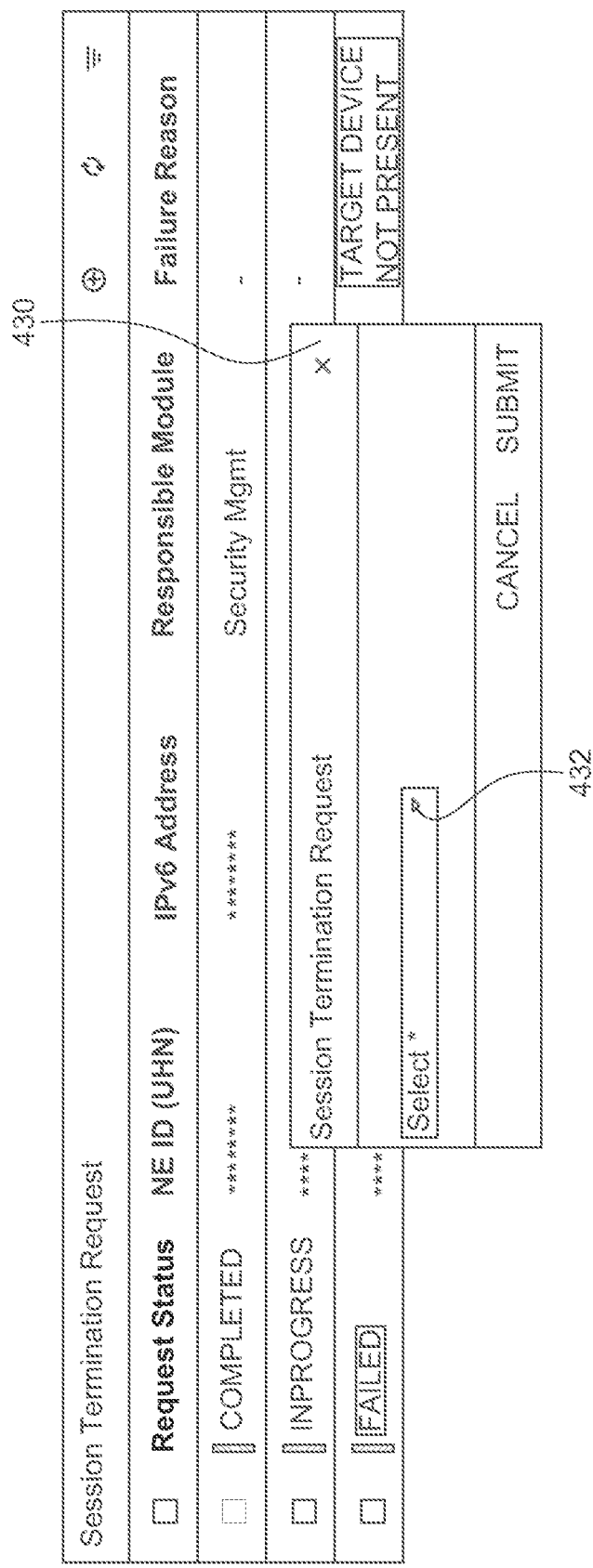
Figure 4D:
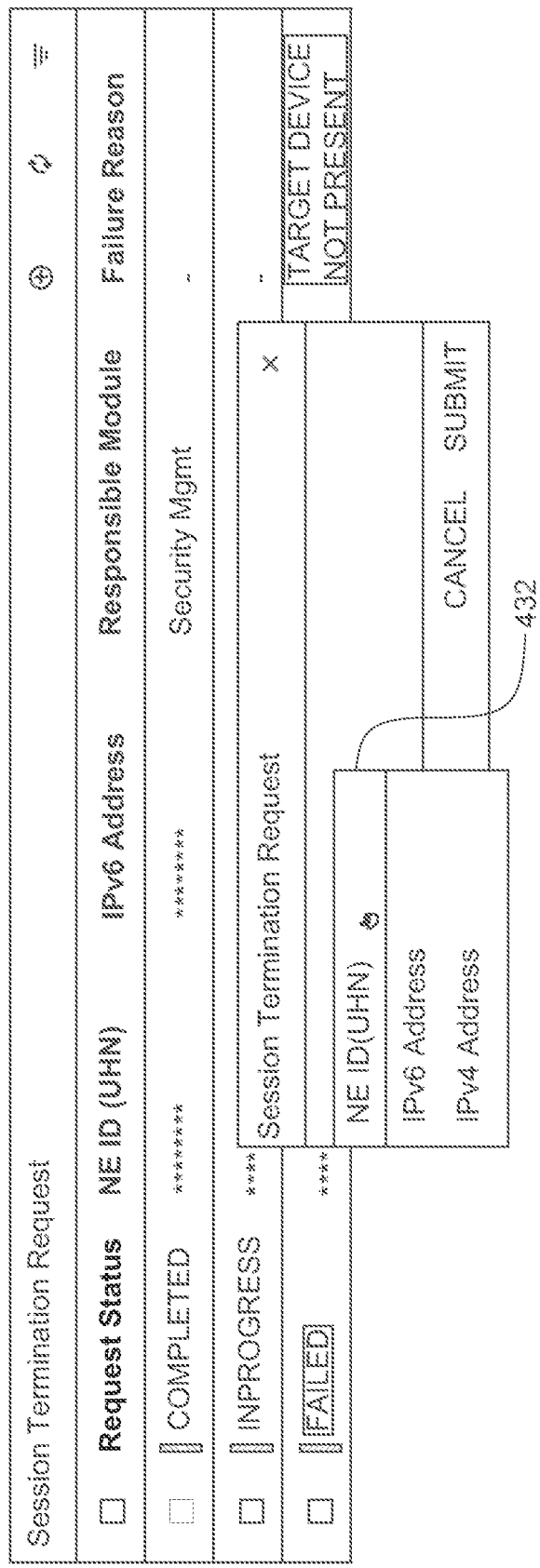
Figure 4E:
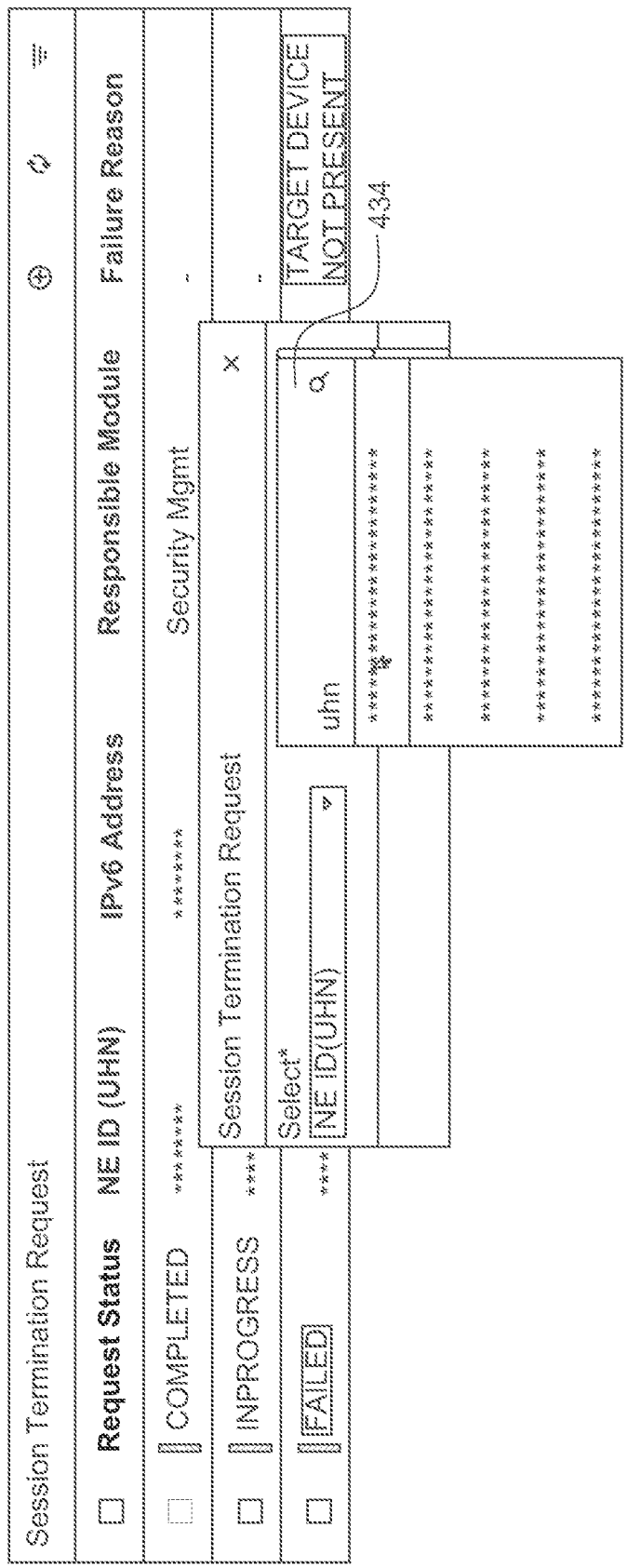

FIGS. 4A-4I are diagrams of a UI for terminating a session, according to an embodiment. Referring to FIG. 4B, the UI displays a list of session termination requests, such as requests 402, 404 and 406. Request 402 has been successfully completed, request 404 is in progress (i.e., the termination script is still being executed or is waiting to be executed), and request 406 has failed. The UI may provide various information for each request, such as the request status 408, the network ID (NE ID) 410, IP address 412, responsible module 414, and failure reason 416. For example, the failure reason for request 406 is that the target device was not present on the server device when the terminations script was executed. The UI may include other information, such as time of request, type of request, user address of the request, server address of the request, credential information, operator information (name, ID, email address, etc.) and other information as will be understood by those of skill in the art from the description herein.

Figure 4I:
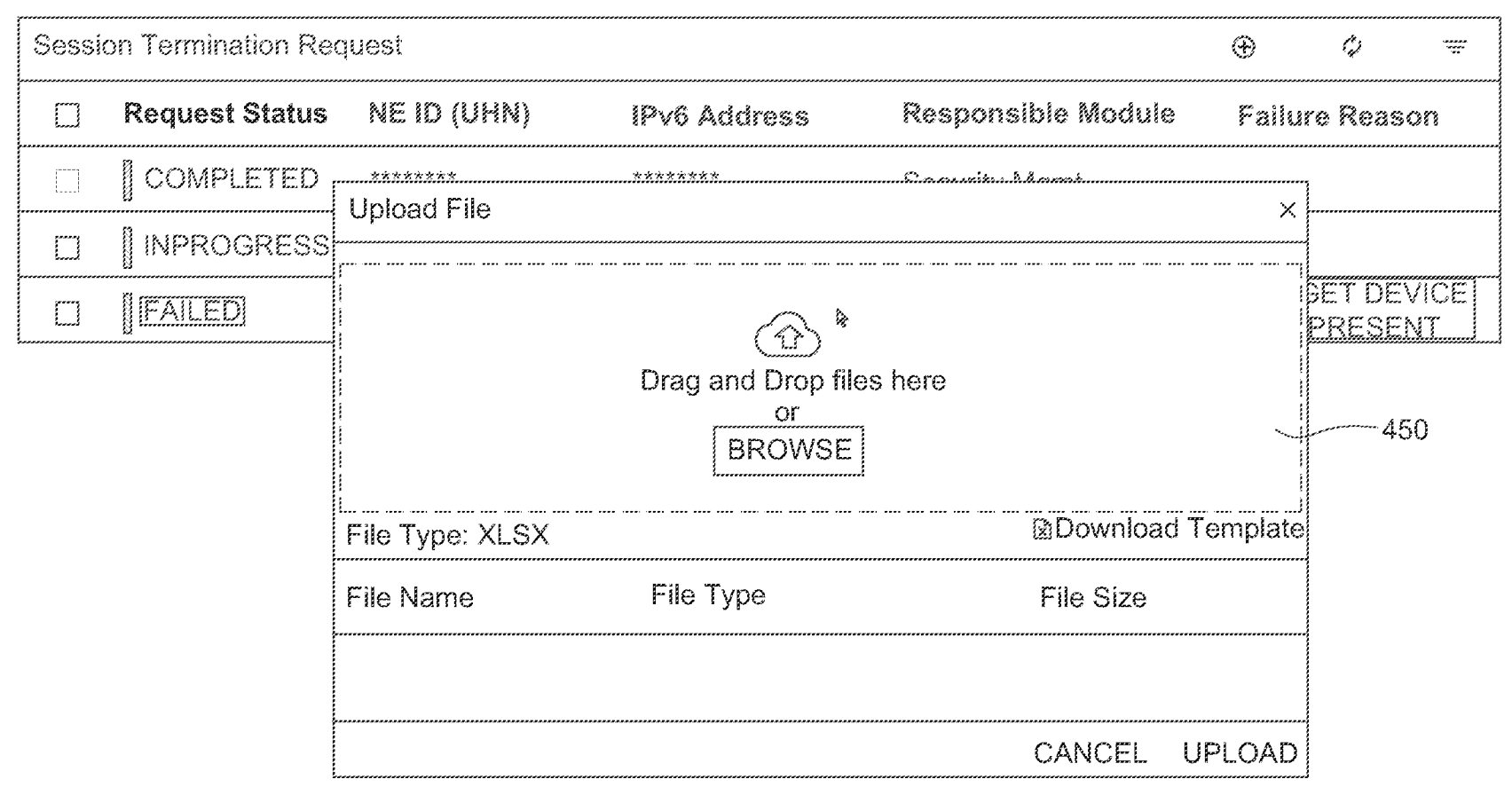

In FIG. 4B, a user of the UI may generate a new request manually 420 or by way of uploading a file 422. FIGS. 4C-4G show an example when a user generates a new request manually. Upon selection, the UI may display a session termination request window 430 with a select dropdown box 432 to select an address type by which the user desires to identify a server device (e.g., NE ID, IPv6 address, IPv4 address, etc.). Upon selection of the address type, the user may select the address by dropdown box 434. Once selected, the user may select an account type of a target device by dropdown box 436, a user type of the target device by dropdown box 438, and a user name by dropdown box 440. The account type and user type may be particular parameters configured with the system, and such parameters may or may not be utilized (i.e., the user may be able to select the user name directly). FIGS. 4H-4I show an example when a user generates a new request via file upload. Upon selecting "upload files" 422, the UI displays an upload file window 450 through which a user may upload a file (e.g., a spreadsheet of user names) to generate a termination request for any number of target devices at once.

According to example embodiments, the systems and methods with the script server may effectively perform session terminations of target devices accessing servers, which reduces an amount of human intervention, reduces the error risks, reduces the operational expenditures, and provides a simplified session termination process (i.e., a user with no knowledge of the session termination process can utilize the systems and methods provided herein and perform the session termination operations).

Figure 5:
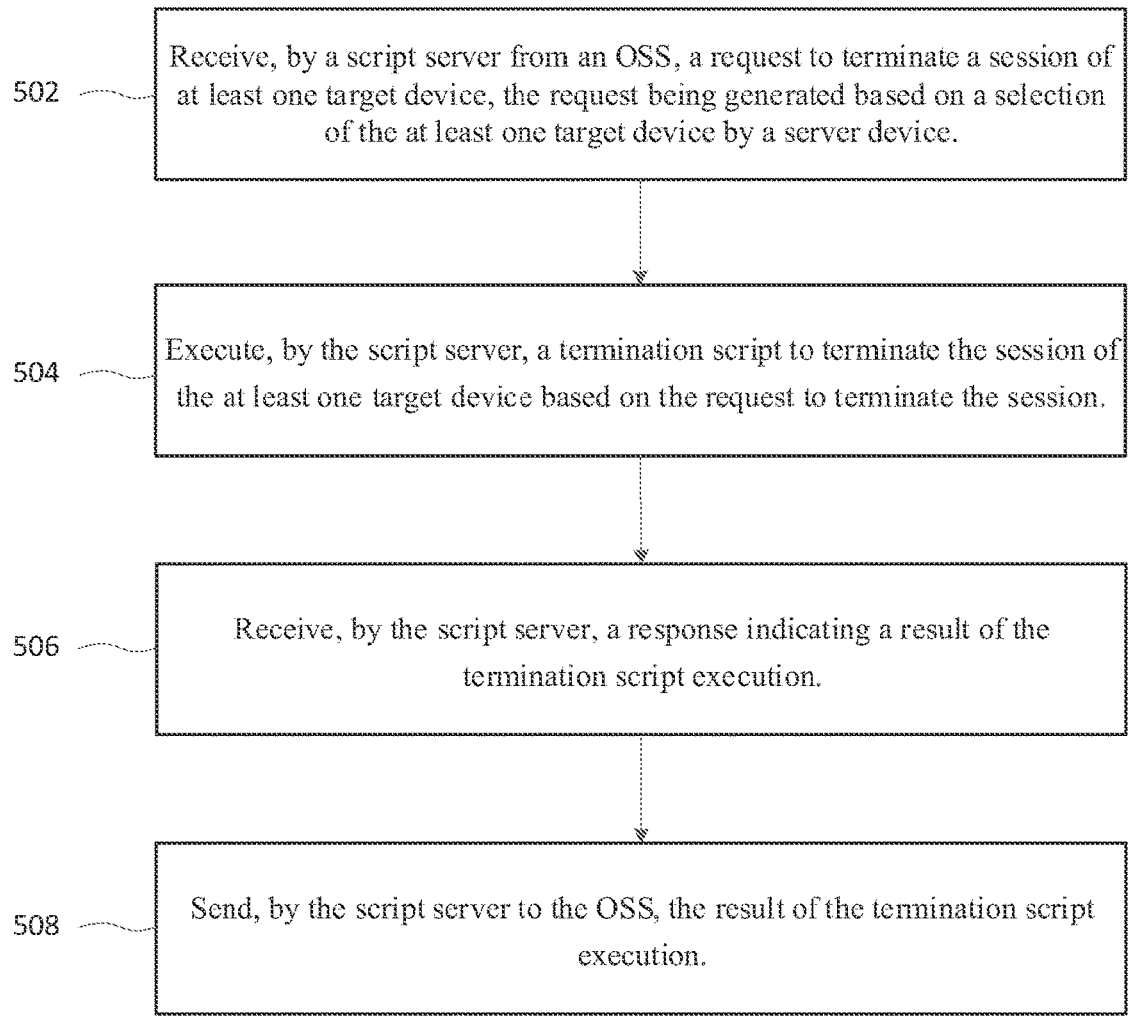
FIG. 5 is a flowchart of a method for termination sessions, according to an embodiment.

FIG. 5 is a flowchart of a method for termination sessions, according to an embodiment. In operation 502, the system receives, by a script server from an OSS, a request to terminate a session of at least one target device (e.g., the at least one target device 308), the request being generated based on a selection of the at least one target device by a server device (e.g., server device 302). For example, the script server 306 may receive the request to terminate the session from the OSS 304. In operation 504, the system executes, by the script server (e.g., the script server 306), a termination script to terminate the session of the at least one target device based on the request to terminate the session. In operation 506, the system receives, by the script server, a response indicating a result of the termination script execution. Alternatively or additionally, the OSS and the server device may receive the response. In operation 508, the system sends, by the script server to the OSS, the result of the termination script execution.

In embodiments, any one of the operations or processes of FIGS. 3-5 may be implemented by or using any one of the elements illustrated in FIGS. 1 and 2.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for session termination, comprising:
receiving, by a script server from an operations support system (OSS), a request to terminate a session of at least one target device, the request being generated based on a selection of the at least one target device by a server device;
executing, by the script server, a termination script to terminate the session of the at least one target device based on the request to terminate the session;
receiving, by the script server, a response indicating a result of the termination script execution; and
sending, by the script server to the OSS, the result of the termination script execution.

2. The method of claim 1, wherein the selection of the at least one target device by the server device is performed in response to a credential change of the at least one target device.

3. The method of claim 2, wherein the credential change of the at least one target device occurs during the session.

4. The method of claim 2, wherein the credential change comprises a password change initiated by the server device.

5. The method of claim 1, wherein the request to terminate the session of the at least one target device comprises at least one credential of the server device.

6. The method of claim 1, wherein the executing, by the script server, the termination script comprises:
accessing the server device from a root user; and
terminating the session of the at least one target device.

7. The method of claim 1, wherein the response indicating the result of the termination script execution comprises a failure indication when the session of the at least one target device does not exist on the server device.

8. A system for session termination, comprising:
a server device,
an operations support system (OSS); and
a script server comprising hardware circuitry,
wherein the script server is configured to:
receive, from the OSS, a request to terminate a session of at least one target device, the request being generated based on a selection of the at least one target device by the server device;
execute a termination script to terminate the session of the at least one target device based on the request to terminate the session;
receive a response indicating a result of the termination script execution; and
send, to the OSS, the result of the termination script execution.

9. The system of claim 8, wherein the selection of the at least one target device by the server device is performed in response to a credential change of the at least one target device.

10. The system of claim 9, wherein the credential change of the at least one target device occurs during the session.

11. The system of claim 9, wherein the credential change comprises a password change initiated by the server device.

12. The system of claim 8, wherein the request to terminate the session of the at least one target device comprises at least one credential of the server device.

13. The system of claim 8, wherein the script server is configured to execute the termination script by:
accessing the server device from a root user; and
terminating the session of the at least one target device.

14. The system of claim 8, wherein the response indicating the result of the termination script execution comprises a failure indication when the session of the at least one target device does not exist on the server device.

15. A non-transitory computer-readable storage medium storing instructions that, when executed by at least one processor, cause the at least one processor to:
- receive, by a script server from an operations support system (OSS), a request to terminate a session of at least one target device, the request being generated based on a selection of the at least one target device by a server device;
- execute, by the script server, a termination script to terminate the session of the at least one target device based on the request to terminate the session;
- receive, by the script server, a response indicating a result of the termination script execution; and
- send, by the script server to the OSS, the result of the termination script execution.

16. The storage medium of claim 15, wherein the selection of the at least one target device by the server device is performed in response to a credential change of the at least one target device.

17. The storage medium of claim 16, wherein the credential change of the at least one target device occurs during the session.

18. The storage medium of claim 16, wherein the credential change comprises a password change initiated by the server device.

19. The storage medium of claim 15, wherein the request to terminate the session of the at least one target device comprises at least one credential of the server device.

20. The storage medium of claim 15, wherein the instructions, when executed, cause the at least one processor to execute, by the script server, the termination script by:
- accessing the server device from a root user, and
- terminating the session of the at least one target device.

* * * * *